3,326,753
BENZIMIDAZOLE ANTHELMINTIC COMPOSITIONS AND METHOD OF USE
Horace D. Brown, Plainfield, N.J., assignor to Merck & Co., Inc., Rahway, N.J., a corporation of New Jersey
No Drawing. Original application Feb. 23, 1961, Ser. No. 90,966, now Patent No. 3,183,239, dated May 11, 1965. Divided and this application Jan. 22, 1964, Ser. No. 339,336
4 Claims. (Cl. 167—53)

This application is a division of our co-pending application Ser. No. 90,966, filed Feb. 23, 1961, now U.S. Patent No. 3,183,239.

This invention relates to new chemical compounds. It relates generally to new derivatives of benzimidazole. More particularly, it relates to benzimidazoles having at the 2-position a heterocyclic radical containing nitrogen and sulfur and at the 5-position an ether or thioether substituent. Still more specifically, it is concerned with 2-R-5-alkoxy- and aryloxy- and 2-R-5-alkylthio- and arylthio-benzimidazoles wherein the R substituent is a thiazolyl, isothiazolyl or thiadiazolyl radical. It is concerned also with methods of making such substances.

The new compounds of this invention have the structural formula

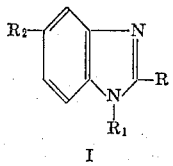

I

R is a five-membered heterocyclic ring containing carbon, nitrogen and sulfur, $R_1$ is hydrogen, a lower alkyl or a lower alkenyl group, or an acyl radical, and $R_2$ is an alkoxy, alkylthio, aryloxy or arylthio radical. The invention also includes within its scope acid addition salts of such benzimidazoles.

The new compounds of Formula I, and acid addition salts thereof, have a high degree of anthelmintic activity and are thus useful in the treatment or prevention of helminthiasis. Helminthiasis involves infestation of the animal body, and particularly the gastro-intestinal tract, with various species of parasitic worms. It is a widespread and serious disease causing malnutrition, weight loss and anemia, and in severe cases internal hemorrhaging and death. The substances now commercially available for treating helminthiasis have been of value in controlling the disease but are not entirely satisfactory.

One object of the present invention is to provide a new class of highly effective anthelmintic compounds. Another object is the provision of 2-substituted-5-ether-benzimidazoles and 2-substituted-5-thioether-benzimidazoles of Formula I above. Still another object is the provision of chemical syntheses of such compounds. Further objects will be evident from the ensuing description of the invention.

The benzimidazoles of the present invention are all substituted at the 2-position with a five-membered heterocyclic ring containing carbon, nitrogen and sulfur. Thus, the ring has at least two hetero atoms and, as will be seen, may have three hetero atoms. In the latter case, two of such atoms will be the same. The heterocyclic ring (R in the above formula), which is attached to the benzimidazole through one of its carbon atoms, may be a thiazolyl, isothiazolyl or thiadiazolyl radical. When R is a thiazolyl or isothiazolyl moiety, the point of attachment to the benzimidazole nucleus may be at any one of the three carbon atoms of the ring, as indicated by the broken lines in the partial structures:

When R is a thiadiazolyl group containing two nitrogen atoms and one sulfur atom in the ring, the radical may be attached to the benzimidazole at either of the two carbon atoms in a 1,2,3-thiadiazole or a 1,2,4-thiadiazole:

With the symmetrical 1,2,5-thiadiazole or 1,3,4-thiadiazole, only one point of attachment exists:

The heterocyclic radical may, if desired, be further substituted at a carbon atom with a lower hydrocarbon group such as a lower alkyl radical, the only limitation in this regard being that imposed by the availability of the substituted thiazoles, isothiazoles or thiadiazoles to be used as starting materials. 2-(2'-thiazolyl)-5-alkoxy-benzimidiazoles having a lower alkyl group at the 4-position of the thiazole ring and the 2-(5'-isothiazolyl)-5-alkylthio-benzimidazoles having a lower alkyl group at the 3-position of the isothiazole ring such as 2-(4'-methyl - 2 - thiazolyl) - 5-methoxy-benzimidazole and 2-(3'-methyl-5'-isothiazolyl)-5-ethylthio-benzimidazole are illustrative of this aspect of the invention.

The N-1 position of the benzimidazoles ($R_1$ in Formula I) may be substituted with hydrogen, a lower alkyl group such as methyl, ethyl, propyl or isopropyl, or a lower alkenyl radical of the type represented by allyl and methallyl. The alkyl and alkenyl radicals preferably contain less than six carbon atoms. $R_1$ may also be an acyl radical, examples of suitable substituents being lower alkanoyl groups such as acetyl, propionyl, butyryl, and valeryl, aroyl radicals such as benzoyl or p-halo benzoyl, or aralkanoyl moieties of which the phenylacetyl group is exemplary. The preferred N-1 acyl groups are those having less than nine carbon atoms.

The preferred compounds of this invention have an alkoxy or alkylthio radical at the 5-position of the benzimidazole ring. Typical examples of such substituents are lower alkoxy groups such as methoxy, ethoxy, isopropoxy, t-butoxy and the like, and lower alkylthio groups, instances of which are methylthio, ethylthio and propylthio substituents. Also within the purview of the invention are compounds wherein the substituent at the 5-position of the benzimidazole ring is an aryloxy or arylthio group. Among these the phenoxy and phenylthio radicals are preferred, although groups such as p-methyl phenoxy and p-methyl phenylthio may be used if desired. It will be appreciated by those skilled in this art that the 5- and 6-positions of the benzimidazole ring are equivalent, due to the symmetry of the ring, when both of the nitrogen atoms are unsubstituted. In such cases it is customary to describe the compounds as 5(6)-alkoxy(or aryloxy)- or 5(6)-alkylthio(or arylthio)-benzimidazoles. When this symmetry is lost by substitution at one of the nitrogen atoms, the compounds are defined as 5-substituted benzimidazoles.

Representative examples of the novel benzimidazoles of this invention are 2-(2'-thiazolyl)-5(6)-methoxy-benzimidazole,
2-(4'-thiazolyl)-5(6)-methoxy-benzimidazole, 2-(4′-thiazolyl)-5(6)-methylthio-benzimidazole,
2-(4′-isothiazolyl)-5(6)-ethylthio-benzimidazole,
2-[4′-(1′,2′,3′-thiadiazolyl)]-5(6)-ethoxy-benzimidazole,
1-methyl-2-(4′-thiazolyl)-5-methoxy-benzimidazole,
1-allyl-2-(2′-thiazolyl)-5-propoxy-benzimidazole,
1-benzoyl-2-(4′-thiazolyl)-5-methoxy-benzimidazole,
1-acetyl-2-(4′-isothiazolyl)-5-methoxy-benzimidazole,
2-(4′-methyl-2′-thiazolyl)-5(6)-ethoxy-benzimidazole,
2-(2′-thiazolyl)-5-phenoxy-benzimidazole, and
2-(4′-thiazolyl)-5-phenylthio-benzimidazole.

The 2,5-disubstituted benzimidazoles described herein may be recovered as free bases or as salts by the processes normally employed for their synthesis. The bases are readily converted to acid addition salts by treatment with acid. Typical salts which may be formed in this manner are mineral acid salts such as the hydrohalides, e.g., hydrochloride, hydrobromide and hydroiodide, sulfates, nitrates, phosphates, and the like, aliphatic acid salts such as the acetate, trimethylacetate, t-butyl-acetate, or propionate, salts of polycarboxylic acids such as the citrate, oxalate, succinate and the like and salts of insoluble organic acids such as the carbonate and hydroxynaphthoate salts. Certain of these salts such as the hydrohalides are more water soluble than the free bases. Since the solubility may be decreased as well as increased by formation of an appropriate salt, it will be seen that the solubility properties of a particular compound may be modified by judicious selection of a salt. When the compounds of this invention are used in salt form as anthelmintics, it is, of course, desirable that the particular acid employed be an edible, non-toxic one. It will be appreciated by those skilled in this art that the acid addition salts will form when the N-1-position of the benzimidazole is unsubstituted or is substituted with an alkyl or alkenyl group, but not when it is N-acylated.

The preparation of these 2-R-5(6)-R$_2$-benzimidazoles, wherein R is a five-membered heterocyclic radical containing carbon, nitrogen and sulfur atoms in the heterocyclic ring, and R$_2$ is a lower alkoxy, lower alkylthio, aryloxy or arylthio radical, comprises broadly the reaction of a thiazolyl, isothiazolyl or thiadiazolyl carboxylic acid or derivative thereof, such as an ester, amide, nitrile, acid halide or aldehyde, with a compound of the general formula

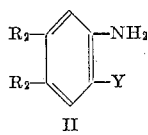

II wherein Y is a nitro or amino group, one R$_2$ is a lower alkoxy, lower alkylthio, aryloxy or arylthio group, and the other R$_2$ substituent is hydrogen.

According to a preferred process such benzimidazoles are obtained from appropriately substituted o-nitroaniline, i.e., an o-nitroaniline having an alkoxy, alkylthio, aryloxy or arylthio substituent meta to either the nitro or amino group. Such substituted o-nitroanilines are intimately contacted with a thiazolyl, isothiazolyl or thiadiazolyl carboxylic acid derivative such as an acid halide or ester, whereupon an o-nitroanilide is produced. When this latter compound contains a lower alkoxy substituent, the nitro group is then reduced either by catalytic hydrogenation using a noble metal catalyst or by reaction with a metal-acid reducing system such as with zinc or iron in the presence of a hydrohalic acid. The resulting amino anilide is converted to the desired benzimidazole in the presence of an acid, and preferably a mineral acid. Normally, the intermediate amino anilide is not isolated but rather ring closed to the benzimidazole directly.

When a 5-(6)-loweralkylthio-benzimidazole is being synthesized, the o-nitroanilide is preferably reduced by catalytic hydrogenation employing a rhenium catalyst, such as rhenium heptasulfide, and the intermediate o-aminoanilide converted, without isolation, to the desired benzimidazole by exposure to acid. In this way there may be prepared 2 - (4′-thiazolyl) - 5(6) - methoxy-benzimidazole from 2-nitro-4-methoxyaniline and 4-thiazole carboxylic acid chloride; 2 - (4′-isothiazolyl) - 5(6)-methylthio-benzimidazole from 2 - nitro - 5 - methylthio-aniline and 4-isothiazole carboxylic acid chloride; 2-(4′-methyl-2′-thiazolyl) - 5(6) - ethoxy - benzimidazole from 2 - nitro - 4 - ethoxyaniline and 2-carbothoxy - 4 - methyl-thiazole; and 2 - [4′-(1′,2′,3′-thiadiazolyl)] - 5(6) - ethyl-thio - benzimidazole from 2 - nitro - 5 - ethylthioaniline and 4 - (1,2,3-thiadiazole) - carboxylic acid chloride.

It is known how to prepare the derivatives of thiazole, isothiazole, and thiadiazole carboxylic acid that serve as one of the starting materials in the syntheses of the benzimidazoles. The substituted o-nitroanilines, which are the other reactants in the process described above, are for the most part known compounds. Particularly alkoxy, aryloxy, alkylthio or arylthio o-nitroanilines that are not specifically described in the literature are readily obtained by application of processes known to those skilled in this art. For instance, any desired o-nitroaniline reactant may be synthesized from nitrophenol or nitrothiophenol by alkylating or arylating the sodium salt of the phenol or thiophenol, reducing the nitro group to an amine, and then nitrating to introduce the nitro group present in the o-nitroaniline.

The 1-substituted benzimidazoles of Formula I above, where the N-1 substituent is a lower alkyl, a lower alkenyl or an acyl radical, are normally synthesized from the parent 2-heteorocycle-5-substituted benzimidazole. This 1-substitution is brought about by first preparing an alkali metal salt of the benzimidazole, such as a sodium, potassium or lithium salt. It is preferred to produce a sodium salt by contacting the benzimidazole with sodium hydride in an anhydrous reaction medium, preferably at a temperature of 40–75° C. Sodamide or a sodium alkoxide may be used instead of sodium hydride, if desired.

In those cases where a 1-alkyl- or 1-alkenyl-benzimidazole is to be prepared, the alkali metal salt is intimately contacted with an alkylating or alkenylating agent, such agents normally being esters of a strong acid and a lower alkanol or a lower alkenol. Examples of such compounds are lower alkyl halides such as methyl bromide, methyl iodide, ethyl bromide, and lower alkanol halides such as allyl bromide or methallyl chloride. Alternatively, alkyl sulfates such as dimethyl and diethyl sulfate may be employed. At the completion of the reaction, the resulting 1-alkyl- or 1-alkenyl-2-R-5 - R$_2$ - benzimidazoles, wherein R and R$_2$ have the meanings set forth above, are recovered and purified by known methods.

The 1-acyl-benzimidazoles are obtained by contacting the benzimidazole alkali metal salt with an acylating agent, and preferably with an acyl halide. Examples of such compounds are lower alkanoyl halides such as acetyl chloride, acetyl bromide, propionoyl chloride and butyryl chloride, aryl halides of the type represented by benzoyl chloride, and aralkanolyl halides such as phenylacetyl chloride. It is preferred to add the acylating agent to a solution or a suspension of the benzimidazole salt in an inert solvent medium and to carry out the reaction at temperatures of 40–100° C. Suitable solvents are aromatic hydrocarbons and/or dimethylformamide. The resulting acyl benzimidazoles may be recovered and purified by known methods, e.g., by removal of the organic solvents under reduced pressure and crystallization of the residual solid product.

As previously mentioned, acid addition salts of the benzimidazoles of Formula I, wherein R$_1$ is hydrogen, lower alkyl or lower alkenyl, are within the purview of this invention. Such salts are conveniently prepared by treating a solution of the benzimidazole with excess acid. Suitable solvents for this purpose are the lower alkanols such as methanol, ethanol and isopropanol. Alternatively, the salts may be formed by contacting a solution of the benzimidazole base with an anion ion exchange resin in the salt form. In addition, the ion exchange resins are conveniently utilized for the metathesis of one acid addition salt to a different acid salt.

The 2,5-disubstituted benzimidazoles of Formula I above, and non-toxic acid addition salts thereof, have a high degree of anthelmintic activity and are useful in the treatment and/or prevention of helminthiasis, a parasitic disease which causes widespread and often serious infection in man and in domesticated animals. In treating domesticated animals, the compounds are normally administered orally in unit dosage form as boluses or liquid drenches wherein the active ingredient is admixed with or suspended in an inert carrier vehicle, or as a component of the animal feed or drinking water. In treating animals such as sheep and cattle therapeutically, a daily oral dose in the range of about 50–400 mg. of benzimidazole compound per kg. of animal body weight is satisfactory. For best results it is preferred to use about 100–300 mg./kg. of body weight. Larger or smaller doses can, of course, be used depending on particular circumstances, such as severity of the infection. For this purpose, a drench or bolus is the usual mode of administration. In treating swine, it is preferred to give the anthelmintic via the feedstuff, in which case feeds containing in the range of about 0.05% to about 0.25% by weight of benzimidazole compound may be employed successfully. The feed is also the vehicle of choice when giving the benzimidazole to sheep and cattle over an extended period of time for the prevention of helminthiasis. In such cases, the anthelmintic may be uniformly distributed throughout the animal feedstuff, or it may be incorporated in the protein supplements that are normally used as top dressings for ruminant feeds. As will be understood by those skilled in the art, the dose levels for continued prophylactic use will be lower than in the therapeutic applications.

The following examples are given for the purpose of illustration and not by way of limitation:

EXAMPLE 1

2-(4'-thiazolyl)-5(6)-methoxy-benzimidazole

A mixture of 1.4 g. of 4-thiazole carboxylic acid chloride and 1.7 g. of 2-nitro-4-methoxyaniline in 35 ml. of pyridine is heated for 6 hours at 70 C. The reaction mixture is then poured into 300 ml. of cold water and the resulting yellow solid collected by filtration, and washed in succession with water, dilute hydrochloric acid, 5% aqueous sodium bicarbonate and water. The solid is then recrystallized from 800 ml. of ethanol to give substantially pure 2-nitro-4-methoxy-4'-thiazoloylaniline, M.P. 200–201° C.

2 g. of the above aniline derivative and 1 g. of 5% palladium on charcoal are added to 500 ml. of dry ethanol and the solution hydrogenated for 16 hours at room temperature and at a pressure of 40 p.s.i. At the end of this reaction time the mixture is filtered to remove the catalyst. To the resulting clear solution of 2-amino-4-methoxy-4'-thiazoloylaniline there is added 50 ml. of concentrated hydrochloric acid and 10 ml. of water and the resulting solution refluxed for 4 hours. The solution is then concentrated in vacuo to a volume of about 50 ml. and the concentrate chilled to give crystals of 2-(4'-thiazolyl)-5(6)-methoxy-benzimidazole hydrochloride. A solution of this product in 50 ml. of methanol and subsequent dilution with 100 ml. of ether yields substantially pure crystalline hydrochloride, M.P. 220–230° C. The free base is prepared by treatment of the salt with excess aqueous sodium bicarbonate, extraction of the aqueous solution with methylene dichloride, concentration of the methylene dichloride extract to dryness and crystallization of the residue from ethylacetate-petroleum ether. The 2-(4'-thiazolyl)-5(6)-methoxybenzimidazole thus obtained melts at 175–176 C.

The sulfate salt is prepared by dissolving 0.5 g. of the free base in 10 ml. of ethanol and treating the solution with a 10% excess of alcoholic sulfuric acid. The acid solution is diluted with ethyl-ether until turbid and then cooled to give the sulfate salt.

When the above process is carried out using 4-thiazole carboxylic acid chloride and 2-nitro-4-ethoxyaniline as the starting materials, there is obtained 2-(4'-thiazolyl)-5(6)-ethoxy-benzimidazole.

EXAMPLE 2

2-(2'-thiazolyl)-5(6)-methoxy-benzimidazole 4.2 g. of 2-thiazole carboxylic acid chloride and 5.1 g. of 2-nitro-4-methoxyaniline are mixed in 60 ml. of pyridine. The solution is held at 25 C. for 2 hours and then heated at 70 C. for 4 hours. It is then poured into 500 ml. of ice water and the resulting yellow solid recovered by filtration and washed with water, dilute hydrochloric acid, 5% aqueous sodium bicarbonate and finally with water. The resulting 2-nitro-4-methoxy-2'-thiazolylaniline is purified by recrystallization from ethanol. Purification is desired at this point because the next step is adversely affected by the presence of impurities.

4 g. of the above compound and 2 g. of 5% palladium on charcoal catalyst are added to 800 ml. of dry ethanol and the solution hydrogenated at an initial pressure of 40 p.s.i. The hydrogenation is continued until the theoretical amount of hydrogen is absorbed, additional amounts of fresh catalyst being added if necessary. At the end of the reduction the catalyst is removed by filtration. To the filtrate there is added 80 ml. of concentrated hydrochloric acid and 20 ml. of water. The resulting solution is refluxed for 4 hours and then concentrated to a small volume in vacuo. On cooling, the 2-(2'-thiazolyl)-5(6)-methoxy-benzimidazole crystallizes as the hydrochloride salt. The free base is obtained by neutralizing the solution with ammonium hydroxide before cooling. The base is purified by recrystallization from ethylacetate.

When 2-nitro-4-isopropoxyaniline is employed instead of 2-nitro-4-methoxyaniline in the above process, there is obtained 2-(2'-thiazolyl)-5(6)-isopropoxy-benzimidazole.

EXAMPLE 3

2-(4'-thiazolyl)-5(6)-methylthio-benzimidazole 9.2 g. of 2-nitro-5-methylthioaniline and 7.3 g. of 4-thiazole carboxylic acid chloride are added to 75 ml. of pyridine. The resulting mixture is allowed to stand at room temperature for 90 minutes and then heated at 70° C. for 4 hours. It is then poured onto 500 g. of ice and the resulting solid product isolated by filtration. The solid is washed with water, dilute hydrochloric acid, dilute sodium bicarbonate and again with water. It is then recrystalized from a minimum amount of absolute ethanol to give substantially pure 2-nitro-5-methylthio-4'-thiazoloylaniline.

4 g. of this product and 1 g. of rhenium heptasulfide in 600 ml. of absolute ethanol are added to a high pressure autoclave and the mixture hydrogenated at 100° C. After absorption of the theoretical amount of hydrogen, the reaction mixture is cooled, filtered to remove the catalyst and the filtrate treated with a mixture of 75 ml. of concentrated hydrochloric acid and 50 ml. of water. The resulting solution is heated for 4 hours at the reflux temperature and then concentrated under vacuum to a volume of about 100 ml. The solution is then neutralized with ammonia and the precipitated 2-(4'-thiazolyl)-5(6)-methylthio-benzimidazole purified by recrystallizing from ethylacetate.

The hydrochloride salt is prepared by dissolving the free base in a minimum amount of ethanol, adding an excess of ethanolic hydrogen chloride and finally adding ethyl ether until the solution becomes turbid. The solution is then chilled in ice to give crystals of the hydrochloride salt.

When the above process is carried out employing 2-thiazole carboxylic acid chloride or 4-isothiazole carboxylic acid chloride as starting material for the reaction with 2-nitro-5-methylthio aniline, there is obtained respectively 2-(2'-thiazolyl)-5(6)-methylthiobenzimidazole and 2-(4'-isothiazolyl)-5(6)-methylthiobenzimidazole.

EXAMPLE 4

*1-benzoyl-2-(4'-thiazolyl)-5-methoxy-benzimidazole*

4.6 g. of 2-(4'-thiazolyl)-5(6)-methoxy-benzimidazole is dissolved in a mixture of 100 ml. of benzene and 25 ml. of dimethylformamide. The solution is then dried by distilling about 15 ml. of benzene, 2 g. of 50% sodium hydride-mineral oil suspension is then added in small portions. A rapid reaction occurs and stirring is continued for 30 minutes at 70° C. The mixture is allowed to cool to about 40° C. and 2.8 g. of benzoyl chloride added slowly. The reaction mixture is then maintained under gentle reflux for about 3 hours. It is then cooled in ice and extracted rapidly with three 25 ml. portions of ice water. The aqueous extracts are back-extracted with ethylacetate. The organic solutions are combined, dried over magnesium sulfate and concentrated to dryness in vacuo. The residual 1-benzoyl-2-(4'-thiazolyl)-5-methoxy-benzimidazole thus obtained is purified by recrystallization from ethyl-ether.

When the above process is repeated employing 2 g. of acetyl chloride in place of the benzoyl chloride, there is produced 1-acetyl-2-(4'-thiazolyl)-5-methoxybenzimidazole.

EXAMPLE 5

*1-methyl-2-(4'-thiazolyl)-5-methoxy-benzimidazole*

5 g. of 2-(4'-thiazolyl)-5-methoxy-benzimidazole in 60 ml. of dry dimethylformamide are added to 1.6 g. of a 52% sodium hydride emulsion in mineral oil. The resulting mixture is stirred at room temperature for about 30 minutes and then warmed carefully to about 50° C. for 10 minutes. It is cooled to room temperature and 3.6 g. of methyl iodide in 5 ml. of dimethylformamide added slowly to the cooled solution of the benzimidazole sodium salt. The reaction mixture is then heated to about 80° C. for 15 minutes, cooled, diluted with 100 ml. of water and extracted with four 90-ml. portions of ethyl ether. The ether extracts are combined, washed with water, dried over sodium sulfate, filtered and the ether removed in vacuo to give 1-methyl-2-(4'-thiazolyl)-5-methoxy-benzimidazole. The product is purified by crystallization from ethylacetate.

When the above reaction is carried out using allyl bromide in place of methyl bromide, 1-allyl-2-(4'-thiazolyl)-5-methoxy-benzimidazole is produced.

When 2-(4'-isothiazolyl)-5-methylthio-benzimidazole is converted to its sodium salt and the salt reacted with ethyl bromide according to the process described above, there is obtained 1-ethyl-2-(4'-isothiazolyl)-5-methylthio-benzimidazole.

EXAMPLE 6

*2-(4'-thiazolyl)-5(6)-phenoxy-benzimidazole*

3 g. of 4-thiazole carboxylic acid chloride is added slowly at room temperature to a solution of 4.6 g. of 2-nitro-4-phenoxyaniline and 50 ml. of pyridine. The mixture is stirred at 70° C. for 4 hours and at the end of this time it is cooled and poured over 500 g. of chopped ice. The crude 4'-thiazolyl-2-nitro-4-phenoxyanilide that precipitates is recovered by filtration and washed thoroughly with water, 5% aqueous hydrochloric acid, 5% aqueous sodium bicarbonate and finally with water. It is then recrystallized from a minimum volume of benzene. The purified anilide thus obtained is added to 500 ml. of ethanol and treated with hydrogen in the presence of 3 g. of 5% palladium on charcoal catalyst. When the theoretical quantity of hydrogen is absorbed, the palladium catalyst is removed by filtering and 60 ml. of concentrated hydrochloric acid and 15 ml. of water added to the filtrate. The solution thus obtained is refluxed for 3 hours and then concentrated to about one-tenth volume under reduced pressure. On cooling the aqueous concentrate in ice, 2-(4'-thiazolyl)-5(6)-phenoxy-benzimidazole hydrochloride crystallizes. The product is recovered by filtration and recrystallized from ethanol-ether to give substantially pure material. The free base is obtained by the process described in Example 1 by the conversion of 2-(4'-thiazolyl)-5(6)-methoxy-benzimidazole hydrochloride to its free base.

When the above process is carried out employing equimolar amounts of 2-nitro-4-ethoxyaniline and 4-isothiazole carboxylic acid chloride as the reactants, there is produced 2-(4'-isothiazolyl)-5-ethoxy-benzimidazole hydrochloride.

EXAMPLE 7

*2-[3'-(1',2',5'-thiadiazolyl)]-5(6)-methoxy-benzimidazole*

1.3 g. of 1,2,5-thiadiazole-4-carboxylic acid chloride and 1.1 g. of 2-nitro-4-methoxyaniline are added to 40 ml. of α-picoline and the resulting solution heated at 80° C. for 5 hours. The solution is then poured into 150 ml. of ice water and the resulting yellow solid isolated by filtration. This solid, 2-nitro-4-methoxy-3'-(1',2',5'-thiadiazolyl)-aniline, is washed successively with water, dilute hydrochloric acid, dilute sodium carbonate and with fresh water. The product is then recrystallized from ethanol. A solution of the purified compound in 200 ml. of dry ethanol is hydrogenated at an initial pressure of 40 p.s.i. in the presence of 1 g. of 5% palladium on charcoal catalyst. When the theoretical quantity of hydrogen is absorbed, the catalyst is filtered off and 50 ml. of 6 N hydrochloric acid added to the solution. The acidified solution is refluxed for 6 hours and then concentrated to a volume of about 25 ml. in vacuo. 2-[3'-(1',2',5'-thiadiazolyl)]-5(6)-methoxy-benzimidazole hydrochloride crystallizes when the solution is chilled in an ice bath. The free base is obtained by neutralizing an aqueous ethanolic solution of the acid solution with ammonium hydroxide.

When the above process is carried out with 2-nitro-5-phenylthioaniline instead of 2-nitro-5-methoxyanaline, and rhenium pentasulfide employed as the hydrogenation catalyst in place of palladium, 2-[3'-(1',2',5'-thiadiazolyl)]-5-phenylthio-benzimidazole hydrochloride is obtained.

EXAMPLE 8

*1-benzoyl-2[3-(1',2',5'-thiadiazolyl)]-5-phenylthio-benzimidazole*

When the process of Example 4 is repeated using 2-[3'-(1',2',5'-thiadiazolyl)]-5(6)-phenylthio-benzimidazole as the starting material, there is produced 1-benzoyl-2-[3'-(1',2',5'-thiadiazolyl)]-5-phenylthio-benzimidazole.

EXAMPLE 9

Compositions in unit dosage form that are suitable for the oral administration of the benzimidazoles of Formula I above to domesticated animals are:

(1) Drench:

| | | |
|---|---|---|
| 2-(4'-thiazolyl)-5-methoxy-benzimidazole | gm | 2.0 |
| Benzalkonium chloride | ml | 0.1 |
| Antifoam AF | gm | 0.01 |
| Hydroxy ethyl cellulose | gm | 0.05 |
| Sodium phosphate monobasic | gm | 0.025 |
| Water, to | ml | 5.0 |

(2) Bolus:

| | Gm. |
|---|---|
| 2-(2'-thiazolyl)-5-methylthio-benzimidazole | 4.5 |
| Dicalcium phosphate | 1.0 |
| Mg stearate (through 60 mesh) | 0.03 |
| Talc (through 60 mesh) | 0.11 |
| Guar gum (through 60 mesh) | 0.16 |
| Starch | 0.70 |

Preparation of these compositions is by conventional formulating techniques.

Any departure from the above description which conforms to the present invention is intended to be included within the scope of the claims.

What is claimed is:
1. An anthelmintic composition comprising a compound of the formula

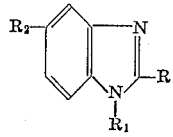

wherein R is a member of the class consisting of thiazolyl, isothiazolyl and thiadiazolyl rings, $R_1$ is selected from the class consisting of hydrogen, lower alkyl, lower alkenyl, lower alkanoyl, benzoyl and phenylacetyl, and $R_2$ is a member of the class consisting of lower alkoxy, lower alkylthio, phenoxy and phenylthio; and non-toxic acid addition salts thereof intimately dispersed in an orally administrable carrier vehicle.

2. The composition of claim 1 wherein the carrier vehicle is an animal feedstuff.

3. The composition of claim 1 wherein the carrier vehicle is a drench.

4. The method of combating helminthiasis in animals that comprises orally administering to animals susceptible to helminth infections an anthelmintic effective amount of a compound of the formula

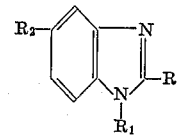

wherein R is a member of the class consisting of thiazolyl, isothiazolyl and thiadiazolyl rings, $R_1$ is selected from the class consisting of hydrogen, lower alkyl, lower alkenyl, lower alkanoyl, benzoyl and phenylacetyl, and $R_2$ is a member of the class consisting of lower alkoxy, lower alkylthio, phenoxy and phenylthio; and non-toxic acid addition salts thereof.

No references cited.

ALBERT T. MEYERS, *Primary Examiner.*

SHELDON J. SINGER, *Assistant Examiner.*